United States Patent
Yoo et al.

(10) Patent No.: US 10,293,692 B2
(45) Date of Patent: May 21, 2019

(54) MOTOR GENERATED ASSIST TORQUE CONTROL FOR HYBRID VEHICLES

(71) Applicant: Toyota Motor Engineering & Manufacturing North America, Inc., Erlanger, KY (US)

(72) Inventors: Dae Keun Yoo, Novi, MI (US); Hiroki Sato, Aichi (JP); Jordan Choby, Ann Arbor, MI (US); Shingo Eto, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 271 days.

(21) Appl. No.: 15/295,283

(22) Filed: Oct. 17, 2016

(65) Prior Publication Data

US 2018/0105047 A1    Apr. 19, 2018

(51) Int. Cl.
*B60L 11/14* (2006.01)
*B60K 6/485* (2007.10)
(Continued)

(52) U.S. Cl.
CPC ............ *B60L 11/14* (2013.01); *B60K 6/26* (2013.01); *B60K 6/485* (2013.01); *B60L 15/2045* (2013.01); *B60W 20/10* (2013.01); B60L 2240/423 (2013.01); B60W 2510/0657 (2013.01); B60W 2710/083 (2013.01); B60Y 2300/60 (2013.01); B60Y 2400/112 (2013.01); Y02T 10/645 (2013.01); Y02T 10/70 (2013.01);
(Continued)

(58) Field of Classification Search
CPC ............ B60L 11/14; B60L 15/2045; B60L 2240/423; B60K 6/26; B60K 6/485; B60W 20/10; B60W 2510/0657; B60W 2710/083; B60Y 2300/60; B60Y 2400/112; Y10S 903/906
USPC .......................................................... 701/22
See application file for complete search history.

(56) References Cited

U.S. PATENT DOCUMENTS 7,878,281 B2    2/2011 Tanishima
2014/0162835 A1*  6/2014 Gotoda ................. B60W 20/10
                                                            477/3
(Continued)

FOREIGN PATENT DOCUMENTS

EP           1987995 A2     11/2008
JP         2004262275 A      9/2004
(Continued)

*Primary Examiner* — Anne M Antonucci
*Assistant Examiner* — James E Stroud
(74) *Attorney, Agent, or Firm* — Dinsmore & Shohl LLP (57) ABSTRACT

A hybrid vehicle is provided. The hybrid vehicle includes an acceleration pedal, an engine configured to generate an engine torque based on a position of the acceleration pedal, an electronic control unit communicatively coupled to the engine and configured to calculate a target torque based on the position of the acceleration pedal, and estimate a motor-generated (MG)-assist torque based on difference between the target torque and the engine torque, a motor generator communicatively coupled to the electronic control unit and configured to generate the estimated MG-assist torque, and a power distribution unit configured to deliver the generated MG-assist torque combined with the engine torque to one or more wheels.

17 Claims, 6 Drawing Sheets

(51) Int. Cl.
*B60K 6/26* (2007.10)
*B60W 20/10* (2016.01)
*B60L 15/20* (2006.01)

(52) U.S. Cl.
CPC ............ *Y02T 10/7077* (2013.01); *Y02T 10/72* (2013.01); *Y02T 10/7283* (2013.01); *Y02T 90/16* (2013.01); *Y10S 903/906* (2013.01)

(56) References Cited

U.S. PATENT DOCUMENTS

| | | | |
|---|---|---|---|
| 2014/0336904 A1* | 11/2014 | Nakanishi | F02D 17/04 701/110 |
| 2015/0012159 A1 | 1/2015 | Honda et al. | |
| 2015/0149009 A1* | 5/2015 | Michikoshi | B60K 6/48 701/22 |
| 2015/0377164 A1 | 12/2015 | Kanno | |
| 2016/0091057 A1* | 3/2016 | Choi | B60K 6/442 74/665 B |

FOREIGN PATENT DOCUMENTS

| | | | |
|---|---|---|---|
| JP | 2004343926 A | 12/2004 | |
| JP | 2010179861 A | 8/2010 | |
| JP | 2012071693 A | 4/2012 | |
| JP | 2013189135 A | 9/2013 | |
| JP | 2015150974 A | 8/2015 | |
| WO | 2012111122 A1 | 8/2012 | |

* cited by examiner

MOTOR GENERATED ASSIST TORQUE CONTROL FOR HYBRID VEHICLES

TECHNICAL FIELD

The present specification generally relates to hybrid vehicles with improved torque response and, more specifically, to controlling torque for hybrid vehicles by applying motor-generator assist torque in addition to engine torque in order to compensate engine response delay.

BACKGROUND

When a vehicle driver presses an accelerator pedal, a certain amount of fuel corresponding to the press is injected to an engine and the engine generates engine torque for driving a vehicle. The engine goes through four cycles to generate torque: intake, compression, combustion, and exhaust. During the cycles, the operation of the engine may be delayed due to various factors, for example, fuel injection delay. Thus, vehicles have a response delay between driver's pedal demand and actual torque generated by the engine.

Accordingly, a need exists for compensating the engine response delay.

SUMMARY

In one embodiment, a hybrid vehicle is provided. The hybrid vehicle includes an acceleration pedal, an engine configured to generate an engine torque based on a position of the acceleration pedal, an electronic control unit communicatively coupled to the engine and configured to calculate a target torque based on the position of the acceleration pedal, and estimate a motor-generated (MG)-assist torque based on difference between the target torque and the engine torque, a motor generator communicatively coupled to the electronic control unit and configured to generate the estimated MG-assist torque, and a power distribution unit configured to deliver the generated MG-assist torque combined with the engine torque to one or more wheels.

According to another embodiment, an electronic control unit for a hybrid vehicle is provided. The electronic control unit includes one or more processors, and a non-transitory memory storing computer readable and executable instructions which, when executed by the processors, cause the electronic control unit to receive an input from an accelerator pedal position sensor of the hybrid vehicle, calculate a target torque based on the input, determine an engine torque generated by an engine of the hybrid vehicle, estimate a motor-generated (MG)-assist torque based on difference between the target torque and the engine torque, and send to a motor generator of the hybrid vehicle a signal for generating the estimated MG-assist torque.

According to another embodiment, a method for compensating a delay of an engine response in a hybrid vehicle is provided. The method includes receiving an input from an accelerator pedal position sensor of the hybrid vehicle, calculating a target torque based on the input, determining an engine torque generated by an engine of the hybrid vehicle, estimating a motor-generated (MG)-assist torque based on difference between the target torque and the engine torque, and sending to a motor generator of the hybrid vehicle a signal for generating the estimated MG-assist torque.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to a hybrid vehicle including a motor generator that generates motor-generated (MG) assist torque. The MG-assist torque is generated based on a difference between a target torque corresponding to a press of an accelerator pedal and an actual engine torque. Positive MG-assist torque is generated to compensate the engine response when the hybrid vehicle is accelerating and negative MG-assist torque is generated to reduce excess engine torque when the hybrid vehicle is decelerating. Various embodiments of hybrid vehicles with a motor generator generating MG-assist torque will be described in further detail herein with specific reference to the appended drawings.

Figure 1:
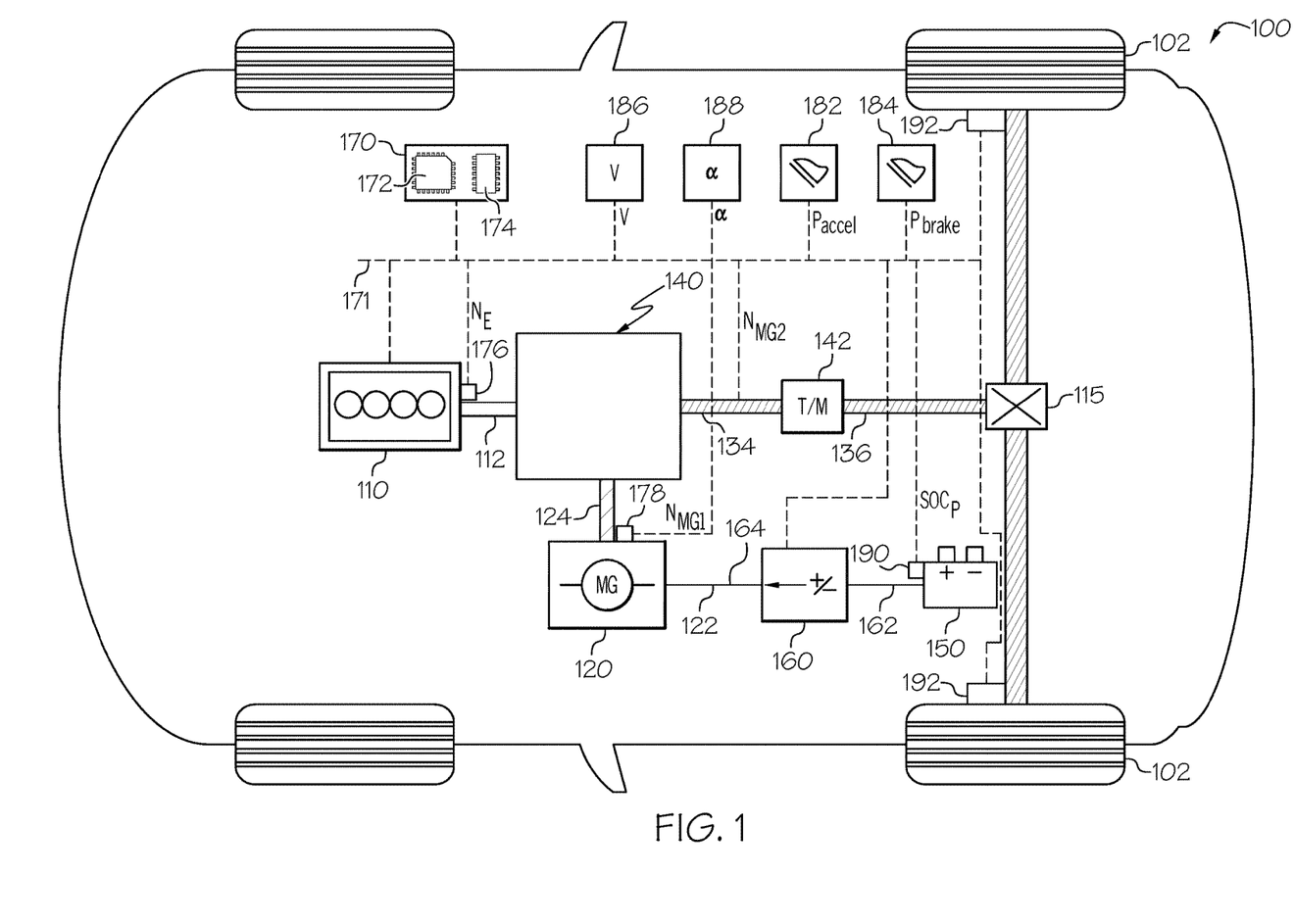
FIG. 1 schematically depicts a diagram of a hybrid vehicle according to one or more embodiments shown and described herein.

Referring now to FIG. 1, an embodiment of a hybrid vehicle 100 is schematically depicted. The hybrid vehicle 100 includes a plurality of drive wheels 102, a differential gear 115, an internal combustion engine 110, a motor generator 120, a power distribution unit 140, a transmission 142, an electrical energy storage device 150, an electrical energy distribution device 160, an electronic control unit 170, a communication path 171, and a number of sensors configured to sense a number of parameters associated with the operation of the hybrid vehicle 100. The various components of the hybrid vehicle 100 will now be described.

Still referring to FIG. 1, the internal combustion engine 110 converts thermal energy released by controlled combustion of fuel into mechanical energy, which may be used by the hybrid vehicle 100 for a number of purposes, such as to rotate the plurality of drive wheels 102 of the hybrid vehicle 100. In some embodiments, the fuel combusted by the internal combustion engine 110 is gasoline or diesel oil. In some embodiments, the fuel combusted by the internal combustion engine 110 may be another type of fuel, such as propane, natural gas, ethanol, biodiesel, hydrogen, or any other fuel that may be combusted within the internal combustion engine 110 to produce thermal energy that may be converted into mechanical energy usable by the hybrid vehicle 100. The internal combustion engine 110 includes a crankshaft 112 that is caused to rotate by the combustion of the fuel within the internal combustion engine 110. In some embodiments, the crankshaft 112 converts reciprocating motion of one or more pistons driven by combustion of fuel within one or more cylinders.

The motor generator 120 is a machine that converts between electrical energy and mechanical energy. The motor generator 120 includes an electrical energy port 122 and an output shaft 124. The motor generator 120 is capable of operating in a motor mode and in a generator mode. When the motor generator 120 operates in the motor mode, electrical energy is received at the electrical energy port 122 and converted to mechanical energy when the output shaft 124 rotates in response to the electrical energy received at the electrical energy port 122. When the motor generator 120 operates in the generator mode, mechanical energy is received at the output shaft 124, the mechanical energy received at the output shaft 124 causes the output shaft 124 to rotate, and the mechanical energy of the rotating output shaft 124 is converted to electrical energy that is output at the electrical energy port 122. In the embodiment depicted in FIG. 1, the motor generator 120 is a synchronous motor generator that, when operating in the motor mode, is driven by alternating current. When the motor generator 120 is driven by alternating current, the rotation of the output shaft 124 is synchronized with the frequency of the alternating current received at the electrical energy port 122. In other embodiments, the motor generator 120 is not a synchronous motor generator, such as embodiments in which the motor generator 120 is an induction motor generator.

Still referring to FIG. 1, the power distribution unit 140 is mechanically coupled to the engine 110 through a crankshaft 112 and to the motor generator 120 through the output shaft 124. The power distribution unit 140 is also mechanically coupled to the transmission 142 through a crank 134 and the transmission 142 is mechanically coupled to the differential gear 115 through a crank 136.

Still referring to FIG. 1, the electrical energy storage device 150 stores electrical energy that may be provided to various components of the hybrid vehicle 100, including the motor generator 120. In some embodiments, the electrical energy storage device 150 includes one or more batteries, such as lithium-ion batteries. In some embodiments, the electrical energy storage device 150 includes one or more high capacity capacitors (sometimes referred to as "supercapacitors" or "ultracapacitors"). In some embodiments, the electrical energy storage device 150 includes an electrical energy storage device (e.g., one or more batteries) and a secondary electrical energy storage device (e.g., one or more capacitors).

The electrical energy distribution device 160 includes a first electrical energy port 162, and a second electrical energy port 164. The first electrical energy port 162 of the electrical energy distribution device 160 is electrically coupled to the electrical energy storage device 150. The second electrical energy port 164 of the electrical energy distribution device 160 is electrically coupled to the electrical energy port 122 of the motor generator 120. As will be more fully described below, the electrical energy distribution device 160 distributes electrical energy from the electrical energy storage device 150 to the motor generator 120 (e.g., when the motor generator 120 operate in the motor mode), as well as distributes electrical energy from the motor generator 120 to the electrical energy storage device 150 (e.g., when the motor generator 120 operate in the generator mode).

Still referring to the electrical energy distribution device 160 of FIG. 1, in some embodiments, the electrical energy distribution device 160 includes one or more DC-DC converters that outputs electrical energy at a voltage different from a voltage of electrical energy received by the DC-DC converter. In some embodiments, the electrical energy distribution device 160 includes one or more inverters for converting between direct current and alternating current, such as then when one or more inverters converts between direct current received by the electrical energy distribution device and alternating current output by the electrical energy distribution device, or vice-versa.

Still referring to FIG. 1, the communication path 171 communicatively couples a number of the electronic components of the hybrid vehicle 100. In particular, the communication path 171 communicatively couples the electronic control unit 170, the internal combustion engine 110, the motor generator 120, the electrical energy distribution device 160, an engine torque sensor 176, a first motor generator rotational speed sensor 178, an accelerator pedal position sensor 182, a brake pedal position sensor 184, a vehicle speed sensor 186, a vehicle acceleration sensor 188, an electrical energy storage device state of charge sensor 190, a plurality of wheel speed sensors 192 and an engine torque sensor (not shown in FIG. 1).

The communication path 171 may be formed from any medium that is capable of transmitting a signal such as, for example, conductive wires, conductive traces, optical waveguides, or the like. Moreover, the communication path 171 may be formed from a combination of mediums capable of transmitting signals. In some embodiments, the communication path 171 comprises a combination of conductive traces, conductive wires, connectors, and buses that cooperate to permit the transmission of electrical data signals to components such as processors, memories, sensors, input devices, output devices, and communication devices. Accordingly, the communication path 171 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 171 communicatively couples the various components of the hybrid vehicle 100. As used herein, the term "communicatively coupled" means that coupled components are capable of exchanging data signals with one another such as, for example, electrical signals via conductive medium, electromagnetic signals via air, optical signals via optical waveguides, and the like.

Still referring to FIG. 1, the electronic control unit 170 includes one or more processors 172 and one or more memory modules 174 communicatively coupled to the one or more processors 172. Each of the one or more processors 172 of the electronic control unit 170 may be any device capable of executing machine readable instructions. Accordingly, each of the one or more processors 172 may be a controller, an integrated circuit, a microchip, a computer, or any other computing device. The one or more processors 172 are communicatively coupled to the other components of the hybrid vehicle 100 by the communication path 171. Accordingly, the communication path 171 may communicatively couple any number of processors with one another, and allow the components coupled to the communication path 171 to operate in a distributed computing environment. Specifically, each of the components may operate as a node that may send and/or receive data.

The electronic control unit 170 may control the operation of the internal combustion engine 110 and the motor generator 120. For example, the electronic control unit 170 may send an instruction for generating an engine torque to the internal combustion engine 110 and send an instruction for generating a MG torque to the motor generator 120. The electronic control unit 170 determines the target torque of the hybrid vehicle 100 in accordance with an accelerator pedal position sensor output signal ($P_{accel}$) that is output by the accelerator pedal position sensor 182. The electronic control unit 170 may send an instruction for generating an engine torque to the internal combustion engine 110 based on the target torque.

When the hybrid vehicle 100 accelerates or decelerates, the actual engine torque generated by the internal combustion engine 110 generally does not increase or decrease as quickly as the target torque determined by the electronic control unit 170 due to a response delay between a driver's pedal demand and the engine response. The response delay is illustrated in FIG. 2 which will be discussed in detail below. For example, when the hybrid vehicle 100 accelerates, the actual engine torque increases more slowly than the target torque. Thus, the actual engine torque is less than the target torque while the hybrid vehicle 100 is accelerating. When the hybrid vehicle 100 decelerates, the actual engine torque decreases more slowly than the target torque. Thus, the actual engine torque is greater than the target torque while the hybrid vehicle 100 is decelerating.

In order to compensate the difference between the target torque and the actual engine torque, the electronic control unit 170 determines a MG-assist torque to be generated by the motor generator 120, which compensates the response delay. The electronic control unit 170 estimates the MG-assist torque based on the following equation:

$$\text{MG-assist torque} = \text{Target torque} - \text{Engine torque} \quad \text{[Equation 1]}$$

The target torque may be torque calculated based on ideal drive force on each vehicle condition. The engine torque may be actual engine torque detected by the electronic control unit 170 by using various sensors including an engine torque sensor. The electronic control unit 170 sends an instruction for the MG-assist torque to the motor generator 120, and the motor generator 120 generates the MG-assist torque to compensate the engine response delay.

In some embodiments, MG-assist torque may be adjusted for providing better drivability to a driver. For example, in order to avoid an abrupt response to a driver, the MG-assist torque may be smoothened to a new MG-assist torque, i.e., MG assist torque (Request) using one order/timer delay as in the following equation.

$$MG \text{ assist torque (Request)} = MG \text{ assist torque } [i-1] + \frac{MG \text{ torque} - MG \text{ torque (Request)}[i-1]}{\text{Gain}} \quad \text{[Equation 2]}$$

The MG assist torque (Request) is a smoothened MG assist torque by incrementally increasing the MG-assist torque to the MG-assist torque (request). The variable i denotes a task number (i.e., i−1 denotes one task before). Gain is a predetermined value set for improving drivability of a vehicle.

Each of the one or more memory modules 174 of the hybrid vehicle 100 is coupled to the communication path 171 and communicatively coupled to the one or more processors 172. The one or more memory modules 174 may comprise RAM, ROM, flash memories, hard drives, non-transitory storage media, or any device capable of storing machine readable instructions such that the machine readable instructions can be accessed and executed by the one or more processors 172. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 174. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 174 may store computer readable and executable instructions which, when executed by the processors, causes the electronic control unit 170 to perform receiving an input from the accelerator pedal position sensor 182, calculating a target torque based on the input, determining an engine torque generated by the internal combustion engine 110, estimating a MG-assist torque based on difference between the target torque and the engine torque, and sending to the motor generator 120 a signal for generating the estimated MG-assist torque, etc.

As noted above, the hybrid vehicle 100 includes a number of sensors, including the engine torque sensor 176, the first motor generator rotational speed sensor 178, the accelerator pedal position sensor 182, the brake pedal position sensor 184, the vehicle speed sensor 186, the vehicle acceleration sensor 188, the electrical energy storage device state of charge sensor 190, and the plurality of wheel speed sensors 192. The engine torque sensor 176 outputs an engine torque signal ($N_E$) indicative of an engine torque of the internal combustion engine 110. The first motor generator rotational speed sensor 178 outputs a first motor generator rotational speed signal ($N_{MG1}$) indicative of a rotational speed of the output shaft 124 of the first motor generator 120. The accelerator pedal position sensor 182 outputs an accelerator pedal position signal ($P_{accel}$) indicative of a position of an accelerator pedal of the hybrid vehicle 100. The brake pedal position sensor 184 outputs a brake pedal position signal ($P_{brake}$) indicative of a position of a brake pedal of the hybrid vehicle 100. The vehicle speed sensor 186 outputs a speed signal (v) indicative of a speed of the hybrid vehicle 100. The vehicle acceleration sensor 188 outputs an acceleration signal (a) indicative of an acceleration of the hybrid vehicle 100. The electrical energy storage device state of charge sensor 190 outputs a state of charge signal ($SOC_p$) indicative of a state of charge of the electrical energy storage device 150. Each of the plurality of wheel speed sensors 192 is associated with a corresponding one of the plurality of drive wheels 102. Each of the plurality of wheel speed sensors 192 outputs a wheel speed signal indicative of a wheel speed of the corresponding drive wheel of the plurality of drive wheels 102. In some embodiments, the hybrid vehicle 100 may not include one or more of the sensors depicted in FIG. 1 and/or may include sensors other than the sensors depicted in FIG. 1.

As noted above, while FIG. 1 depicts a hybrid vehicle 100, the internal combustion engine control methods described herein are not limited to hybrid vehicles. The internal engine control methods described below are applicable to other classes of vehicles, such as conventional vehicles. In addition, the internal engine control methods described herein are applicable to hybrid vehicles that have more than one motor generator.

Figure 2A:
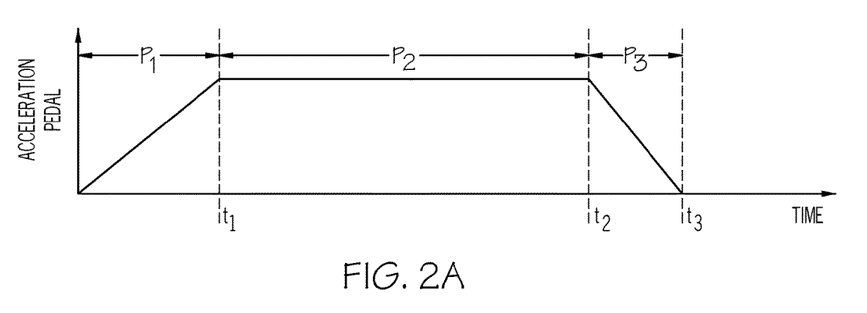
FIG. 2A depicts a timing chart representing an amount of an accelerator pedal of the hybrid vehicle of FIG. 1 being pressed.
Figure 2B:
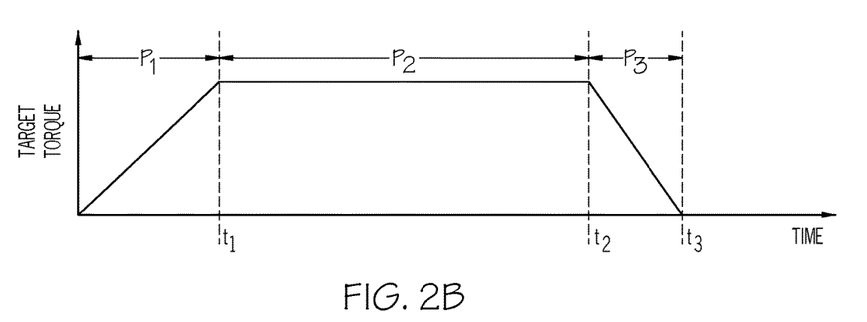
FIG. 2B depicts a timing chart representing a target torque requested based on the amount of the accelerator pedal being pressed.
Figure 2C:
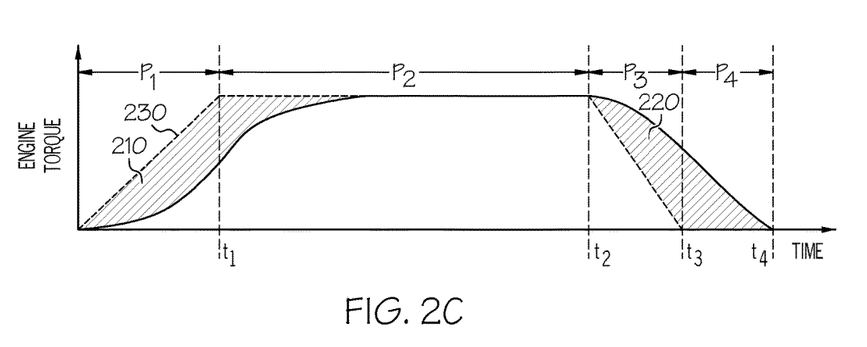
FIG. 2C depicts a timing chart representing an engine torque provided by an internal combustion engine of the hybrid vehicle of FIG. 1.
Figure 2D:
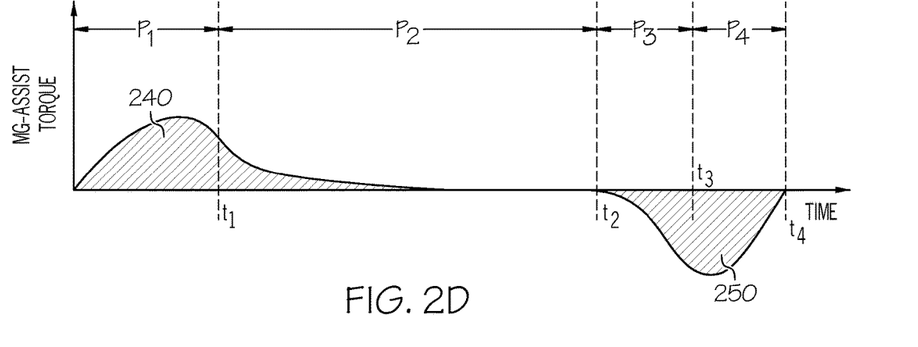
FIG. 2D depicts a timing chart representing a MG-assist torque provided by an motor generator of the hybrid vehicle of FIG. 1.
Figure 2E:
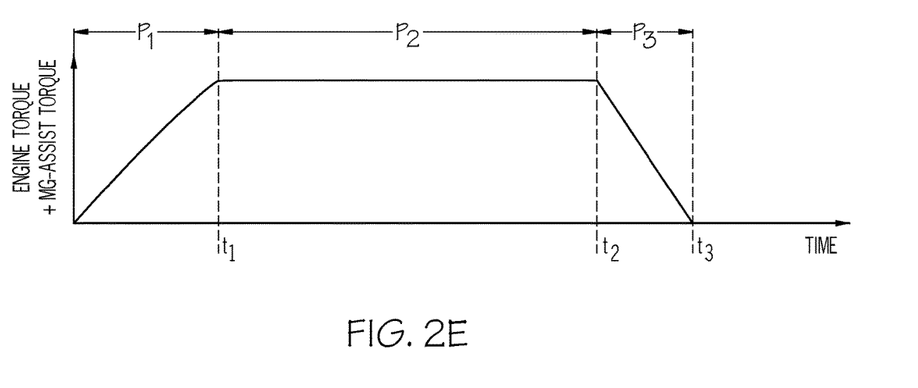
FIG. 2E depicts a timing chart representing a combined torque of the engine torque of the timing chart of FIG. 2C and the MG-assist torque of the timing chart of FIG. 2D.

FIGS. 2A-2E schematically depict a timing chart representing a change of vehicle torque when the vehicle accelerates and decelerate in accordance with one embodiment of the present application. FIG. 2A depicts a timing chart representing an amount of the accelerator pedal being pressed (i.e., displacement of the accelerator pedal from an original position). FIG. 2B depicts a timing chart representing a target torque requested based on the amount of the accelerator pedal being pressed. FIG. 2C depicts a timing chart representing an engine torque provided by the internal combustion engine 110. FIG. 2D depicts a timing chart representing a MG-assist torque provided by the motor generator 120. FIG. 2E depicts a timing chart representing a combined torque of the engine torque of the timing chart of FIG. 2C and the MG-assist torque of the timing chart of FIG. 2D.

With respect to FIG. 2A, during the period of $P_1$ (i.e., from time 0 to $t_1$), a driver of the hybrid vehicle 100 gradually presses the accelerator pedal. During the period of $P_2$ (i.e., from time $t_1$ through $t_2$), the driver maintains the press on the accelerator pedal and the position of the accelerator pedal is maintained. During the period of $P_3$ (i.e., from time $t_2$ through $t_3$), the driver gradually releases the accelerator pedal.

FIG. 2B illustrates the target torque associated with the displacement of the accelerator pedal. The target torque may be calculated based on an ideal drive force for driving a vehicle. For example, the target torque may be an engine torque generated by an engine with no response delay which can more directly relate acceleration pedal displacement to target torque for a particular engine. Different engines may have different target torque values depending on accelerator pedal displacement. During the period of $P_1$ (i.e., from time 0 to $t_1$), the target torque gradually increases as the driver gradually presses the accelerator pedal. During the period of $P_2$ (i.e., from time $t_1$ through $t_2$), the target torque is maintained as the driver maintains a substantially constant displacement of the accelerator pedal. During the period of $P_3$ (i.e., from time $t_2$ through $t_3$), the target torque gradually reduces as the driver gradually releases the accelerator pedal.

FIG. 2C illustrates an engine torque generated by the internal combustion engine 110. The internal combustion engine 110 may generate the engine torque in response to an instruction from the electronic control unit 170. During the period of $P_1$ (i.e., from time 0 to $t_1$), the engine torque slowly increases as the driver gradually presses the accelerator pedal, but does not reach the target torque of the timing chart of FIG. 2B. That is, the engine torque increases at a decreased rate than the target torque during the period of $P_1$. The dotted broken line 230 represents the target torque on the timing chart of FIG. 2B. During the period of $P_2$ (i.e., from time $t_1$ through $t_2$), the engine torque continues to increase until it reaches the target torque and maintains the engine torque as the driver maintains a substantially constant displacement on the accelerator pedal. The portion 210 represents the difference between the target torque and the engine torque due to the engine response delay. During the period of $P_3$ (i.e., from time $t_2$ through $t_3$), the engine torque reduces as the driver gradually releases the accelerator pedal, but reduces more slowly than the target torque. During the period of $P_4$ (i.e., from time $t_3$ through $t_4$), the engine torque continues to reduce until it becomes zero. The portion 220 represents the difference between the target torque and the engine torque due to the engine response delay.

FIG. 2D illustrates a MG-assist torque generated by the motor generator 120. The motor generator 120 may generate the MG-assist torque in response to an instruction from the electronic control unit 170 during acceleration of the hybrid vehicle 100. The MG-assist torque is generated based on the difference between the target torque and the engine torque. Specifically, the MG-assist torque may be calculated based on the equation 1 above. During the period of $P_1$ (i.e., from time 0 to $t_1$), the MG-assist torque gradually increases as the difference between the target torque and the engine torque increases and then decreases as the difference between the target torque and the engine torque decreases. During the period of $P_2$ (i.e., from time $t_1$ through $t_2$), the MG-assist torque keeps decreasing until the engine torque reaches the target torque. During the period of $P_3$ (i.e., from time $t_2$ through $t_3$), the MG-assist torque is a negative value to offset the extra engine torque due to the engine response delay during deceleration of the hybrid vehicle 100. The MG-assist torque continues to decrease as the difference between the target torque and the engine torque increases. During the period of $P_4$ (i.e., from time $t_3$ through $t_4$), the MG-assist torque increases until it becomes zero as the difference between the target torque and the engine torque reduces.

FIG. 2E illustrates a combined torque of the engine torque and the MG-assist torque. The combined torque is combined by the power distribution unit 140 and forwarded to the wheels 102. During the period of $P_1$ (i.e., from time 0 to $t_1$), a driver of the hybrid vehicle 100 gradually presses the accelerator pedal. During the period of $P_1$ (i.e., from time 0 to $t_1$), the combined torque gradually increases as the driver gradually presses the accelerator pedal. During the period of $P_2$ (i.e., from time $t_1$ through $t_2$), the combined torque is maintained as the driver maintains the press on the accelerator pedal. During the period of $P_3$ (i.e., from time $t_2$ through $t_3$), the combined torque gradually reduces until it becomes zero as the driver gradually releases the accelerator pedal. As shown in FIGS. 2B and 2E, the shape of the timing chart of FIG. 2E approaches or even substantially matches with the shape of the timing chart of FIG. 2E. That is, the combined torque drives the wheels 102 in response to an operation of the accelerator pedal with less delay than the engine torque response of the timing chart of FIG. 2C.

Figure 3:
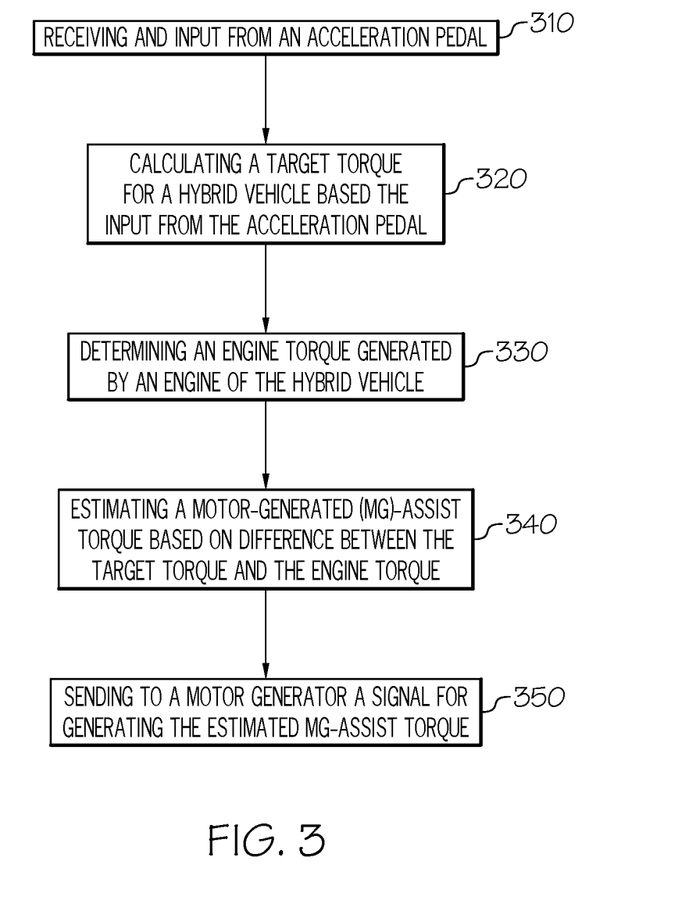
FIG. 3 depicts a schematic flowchart representing a method for compensating a delay of an engine response in a hybrid vehicle according to one or more embodiments shown and described herein.

FIG. 3 depicts a schematic flowchart representing a method for compensating a delay of an engine response in a hybrid vehicle. In step 310, the electronic control unit 170 receives an input from the accelerator pedal position sensor 182 that monitors position of the acceleration pedal. The input may be an indication of pressing the acceleration pedal or releasing the acceleration pedal. The input may also include displacement of the acceleration pedal from an original position of the acceleration pedal (i.e., a position when no external pressure is applied to the acceleration pedal).

In step 320, the electronic control unit 170 calculates a target torque for driving the hybrid vehicle 100 based on the input from the accelerator pedal. The target torque may be calculated based on ideal drive force for the hybrid vehicle 100. In some embodiments, the target torque may be proportional to or otherwise associated with a displacement length of the accelerator pedal or a pressure on the accelerator pedal.

In step 330, the electronic control unit 170 determines an engine torque generated by the internal combustion engine 110 using engine torque sensor. In step 340, the electronic control unit 170 estimates a motor-generated (MG) torque based on difference between the target torque and the engine torque. As discussed above with reference to FIG. 2C, while the hybrid vehicle 100 accelerates or decelerates, there is a gap between the target torque and the engine torque due to an engine response delay. In step 350, the electronic control unit 170 sends to the motor generator 120 a signal for generating the estimated MG-assist torque.

While the MG-assist torque supplements engine torque, the electronic control unit 170 may stop sending to the motor generator 120 a signal for generating the estimated MG-assist torque or change the MG-assist torque to be generated by the motor generator 120 when gear shifting is conducted for the vehicle. This may prevent gear shifting shock due to excess MG-assist torque and improve shifting quality. In some embodiments, the electronic control unit 170 may stop sending to the motor generator 120 a signal for generating the estimated MG-assist torque when the rotation speed of the internal combustion engine 110 falls below a predetermined threshold.

Figure 4A:
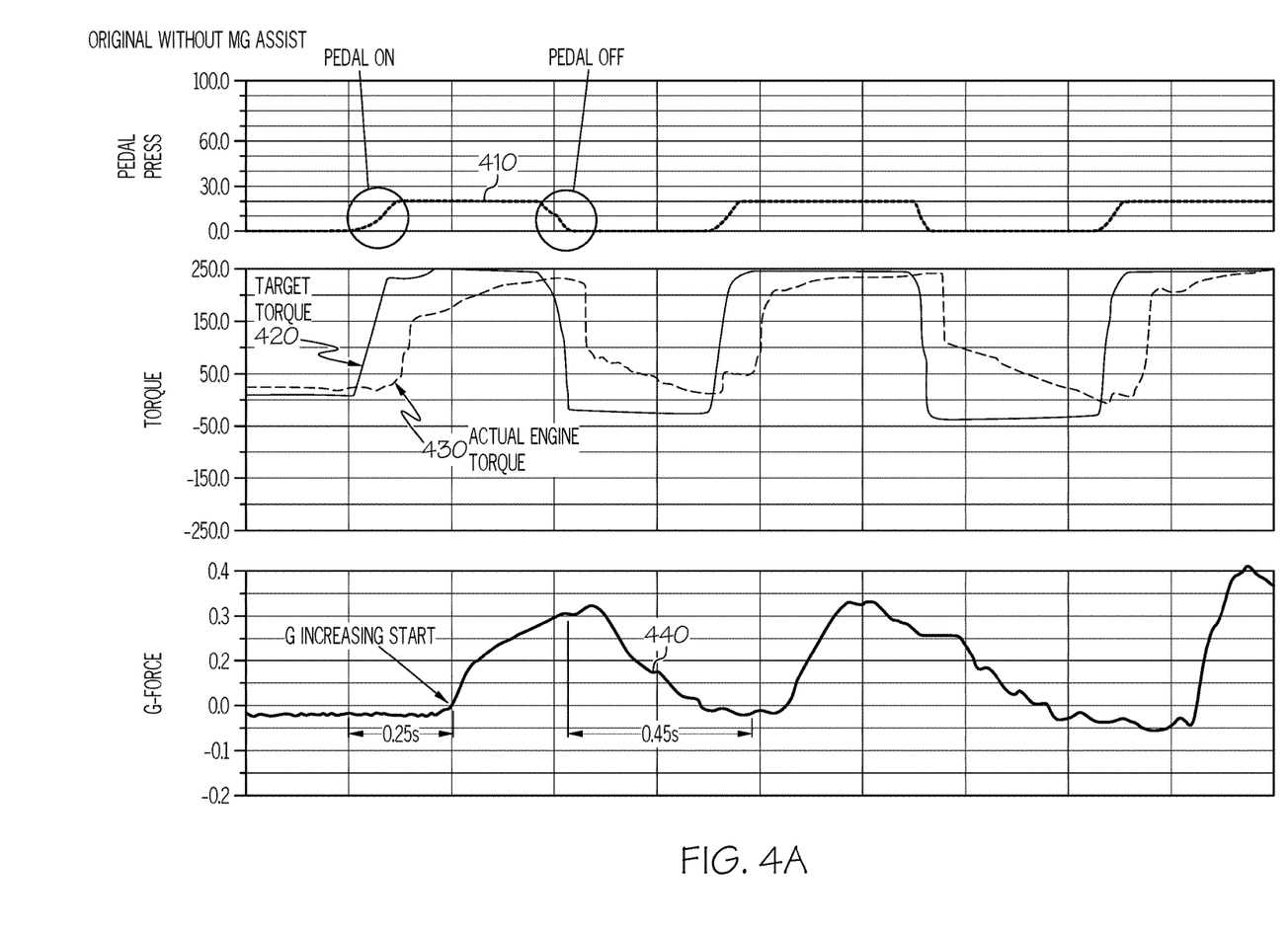
FIG. 4A depicts an exemplary timing chart representing a target torque, an engine torque, and an actual G-force in response to an operation of the accelerator pedal when no MG-assist torque is applied.
Figure 4B:
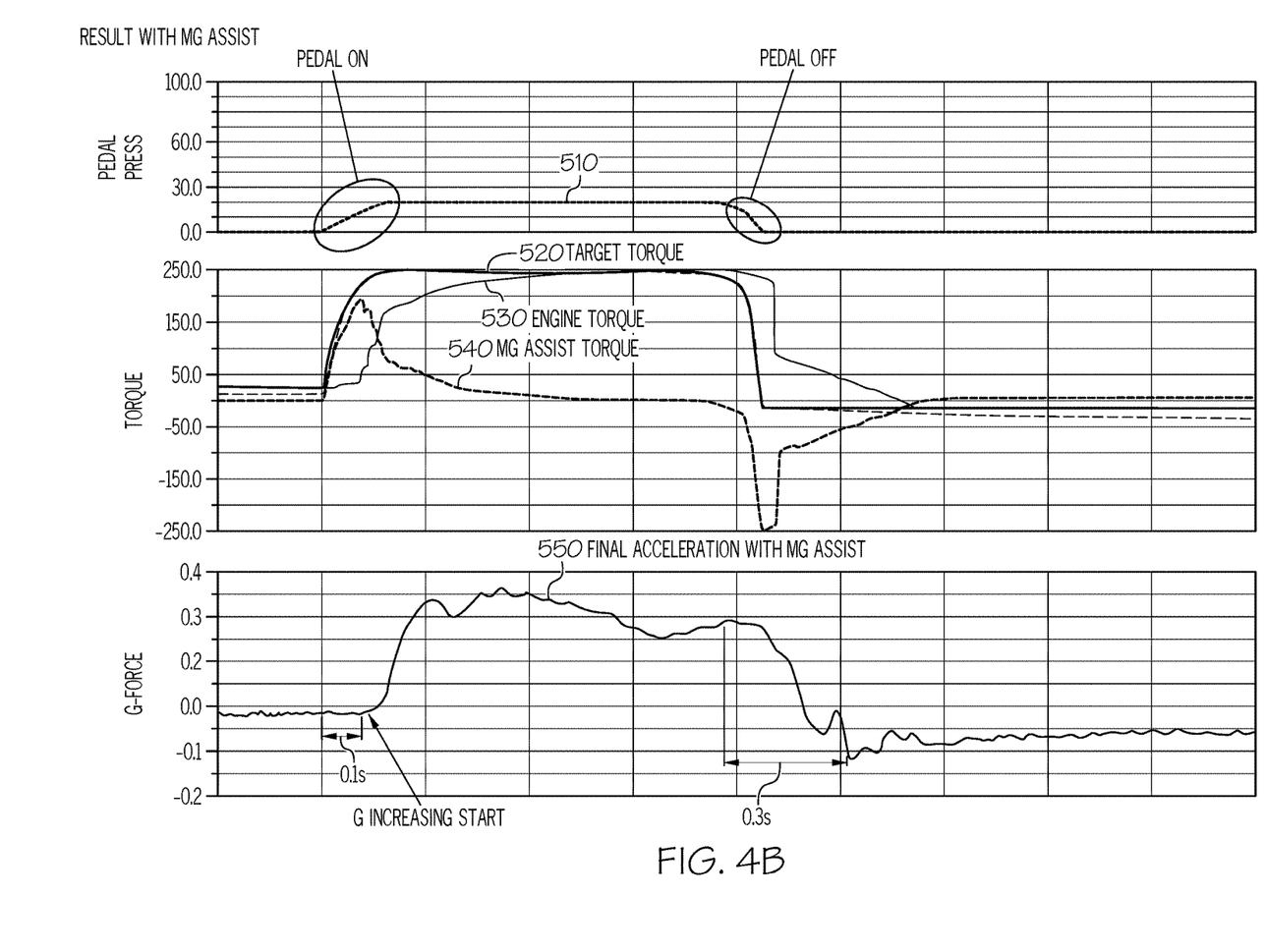
FIG. 4B depicts an exemplary timing chart representing a target torque, an engine torque, an MG-assist torque, an actual G-force in response to an operation of the accelerator pedal when MG-assist torque is applied.

FIG. 4A depicts a timing chart representing a target torque, an engine torque, and a G-force in response to an operation of the accelerator pedal when no MG-assist torque is applied. FIG. 4B depicts a timing chart representing a target torque, an engine torque, an MG-assist torque, a G-force in response to an operation of the accelerator pedal when MG-assist torque is applied. Both timing charts in FIGS. 4A and 4B are prepared based on an actual implementation of the hybrid vehicle 100.

Referring to FIG. 4A, the first graph from the top of FIG. 4A depicts a scaled accelerator pedal press 410. The second graph from the top of FIG. 4A depicts a target torque 420 and an actual engine torque 430. The third graph from the top of FIG. 4A depicts a G-force 440. A G-force is a standard unit of acceleration of 9.8 m/sec$^2$ (i.e., 1G is 9.8 m/sec$^2$). The G-force 440 represents the acceleration of the hybrid vehicle 100 propelled by the engine torque. There exists time difference between when the engine torque is initially generated and when the hybrid vehicle 100 starts acceleration in response to the generated engine torque.

On the second graph of FIG. 4A, the target torque 420 increases as the scaled accelerator pedal press 410 gradually increases (pedal on), and the target torque 420 decreases as the scaled accelerator pedal press 410 decreases (pedal off). The actual engine torque 430 does not increase as rapidly as the target torque 420 due to an engine response delay. There is time difference when the target torque 420 starts increasing and when the actual engine torque 430 starts increasing. Similarly, the actual engine torque 430 does not decrease as rapidly as the target torque 420 due to an engine response delay. There exists time difference when the target torque 420 finishes decreasing and when the actual engine torque 430 finishes decreasing.

On the third graph of FIG. 4A, the G-force starts increasing 0.31 second after the target torque starts increasing. This delay is due to the delayed engine torque in addition to any other response delay. The G-force finishes decreasing 0.61 second after the target torque starts decreasing.

Referring to FIG. 4B, the first graph from the top of FIG. 4B depicts a scaled accelerator pedal press 510. The second graph from the top of FIG. 4B depicts a target torque 520, an actual engine torque 530, and a MG-assist torque 540. The third graph from the top of FIG. 4B depicts a G-force 550. The G-force 550 represents the acceleration of the hybrid vehicle 100 propelled by the engine torque combined with the MG-assist torque.

On the second graph of FIG. 4B, the target torque 520 increases as the scaled accelerator pedal press 510 gradually increases (pedal on), and the target torque 520 decreases as the scaled accelerator pedal press 510 decreases (pedal off). The actual engine torque 530 does not increase as rapidly as the target torque 520 due to an engine response delay. There exists time difference when the target torque 520 starts increasing and when the actual engine torque 530 starts increasing. Similarly, the actual engine torque 530 does not decrease as rapidly as the target torque 520 due to an engine response delay. There exists time difference when the target torque 520 finishes decreasing and when the actual engine torque 530 finishes decreasing.

During acceleration of the hybrid vehicle (i.e., during the pedal is gradually pressed), the MG-assist torque 540 becomes a positive value such that the sum of the positive MG-assist torque 540 and the actual engine torque 530 is comparable to the target torque 520. The MG-assist torque 540 increases as the difference between the target torque 520 and the actual engine torque 530 increases, and decreases as the difference between the target torque 520 and the actual engine torque 530 decreases.

During deceleration of the hybrid vehicle (i.e., during the pedal is gradually depressed), the target torque is less than the actual engine torque. The MG-assist torque 540 becomes a negative value such that the sum of the negative MG-assist torque 540 and the engine torque 530 is comparable to the target torque 520. The MG-assist torque 540 decreases as the difference between the target torque 520 and the actual engine torque 530 increases, and the MG-assist torque 540 increase as the difference between the target torque 520 and the actual engine torque 530 decreases. The negative MG-assist torque 540 may be used for the motor generator 120 to generate electrical energy which is then stored in the electrical energy storage device 150.

On the third graph of FIG. 4B, during acceleration of the hybrid vehicle, the G-force starts increasing (i.e., starts acceleration) 0.14 second after the target torque starts increasing. The 0.14 second represents time difference between when the engine torque and the MG-assist torque are initially generated and when the hybrid vehicle 100 starts acceleration in response to the generated engine torque and MG-assist torque. The G-force in FIG. 4B starts increasing 0.17 second faster than the G-force in FIG. 4A. Thus, a hybrid vehicle generating an MG-assist torque can accelerate faster than a hybrid vehicle without an MG-assist torque. Similarly, during deceleration of the hybrid vehicle, the G-force in FIG. 4B finishes decreasing (i.e., finishes acceleration) 0.2 second faster than the G-force in FIG. 4A. Thus, a hybrid vehicle generating an MG-assist torque can decelerate faster than a hybrid vehicle without an MG-assist torque. Accordingly, a hybrid vehicle generating an MG-assist torque respond more quickly to a driver's operation of the accelerator pedal than a hybrid vehicle without an MG-assist torque.

The present disclosure may compensate an engine response delay by using an MG-assist torque generated by the motor generator when there exists difference between a target torque and an actual engine torque. With the MG-assist torque compensating the engine torque, the drivability response of a hybrid vehicle is significantly enhanced. In addition, because the negative MG-assist torque is used by the motor generator for generating electrical energy which can be stored in the battery, the fuel economy for the hybrid vehicle is not substantially compromised in spite of rapid acceleration and deceleration.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hybrid vehicle comprising:
   an acceleration pedal;
   an engine configured to generate an engine torque based on a position of the acceleration pedal;
   an electronic control unit communicatively coupled to the engine and configured to:
      calculate a target torque based on the position of the acceleration pedal;
      estimate a motor-generated (MG)-assist torque based on difference between the target torque and the engine torque; and
      prevent the motor generator from generating the estimated MG-assist torque during a transmission shifting of the hybrid vehicle,
   a motor generator communicatively coupled to the electronic control unit and configured to generate the estimated MG-assist torque; and
   a power distribution unit configured to deliver the generated MG-assist torque combined with the engine torque to one or more wheels.

2. The hybrid vehicle of claim 1, wherein the estimated MG-assist torque is a positive value when the target torque is greater than the engine torque.

3. The hybrid vehicle of claim 1, wherein the estimated MG-assist torque is a negative value when the target torque is less than the engine torque.

4. The hybrid vehicle of claim 3, wherein the motor generator is configured to generate electrical energy corresponding to the negative value of the estimated MG-assist torque when the target torque is less than the engine torque.

5. The hybrid vehicle of claim 1, further comprising a second motor generator configured to generate the estimated MG-assist torque.

6. An electronic control unit for a hybrid vehicle, comprising:
   one or more processors; and
   a non-transitory memory storing computer readable and executable instructions which, when executed by the processors, cause the electronic control unit to
      receive an input from an accelerator pedal position sensor of the hybrid vehicle;
      calculate a target torque based on the input;
      determine an engine torque generated by an engine of the hybrid vehicle;
      estimate a motor-generated (MG)-assist torque based on difference between the target torque and the engine torque;
      prevent the motor generator from generating the estimated MG-assist torque during a transmission shifting of the hybrid vehicle; and
      send to a motor generator of the hybrid vehicle a signal for generating the estimated MG-assist torque.

7. The electronic control unit of claim 6, wherein the estimated MG-assist torque is a positive value when the target torque is greater than the engine torque.

8. The electronic control unit of claim 6, wherein the estimated MG-assist torque is a negative value when the target torque is less than the engine torque.

9. The electronic control unit of claim 8, wherein the non-transitory memory storing computer readable and executable instructions which, when executed by the processors, cause the electronic control unit to send to the motor generator an instruction for generating electrical energy corresponding to the negative value of the estimated MG-assist torque when the target torque is less than the engine torque.

10. The electronic control unit of claim 6, wherein the non-transitory memory storing computer readable and executable instructions which, when executed by the processor, cause the electronic control unit to prevent the motor generator from generating the estimated MG-assist torque when a rotation speed of the engine is less than a predetermined threshold.

11. The electronic control unit of claim 6, wherein the non-transitory memory storing computer readable and executable instructions which, when executed by the processor, cause the electronic control unit to send to a second motor generator of the hybrid vehicle a signal for generating the estimated MG-assist torque.

12. A method for compensating a delay of an engine response in a hybrid vehicle, comprising:
   receiving an input from an accelerator pedal position sensor of the hybrid vehicle;
   calculating a target torque based on the input;
   determining an engine torque generated by an engine of the hybrid vehicle;
   estimating a motor-generated (MG)-assist torque based on difference between the target torque and the engine torque;
   preventing the motor generator from generating the estimated MG-assist torque during a transmission shifting of the hybrid vehicle; and sending to a motor generator of the hybrid vehicle a signal for generating the estimated MG-assist torque.

13. The method of claim 12, wherein the estimated MG-assist torque is a positive value when the target torque is greater than the engine torque.

14. The method of claim 12, wherein the estimated MG-assist torque is a negative value when the target torque is less than the engine torque.

15. The method of claim 14, further comprising sending to the motor generator an instruction for generating electrical energy corresponding to the negative value of the estimated MG-assist torque when the target torque is less than the engine torque.

16. The method of claim 12, further comprising preventing the motor generator from generating the estimated MG-assist torque when a rotation speed of the engine is less than a predetermined threshold.

17. The method of claim 12, further comprising sending to a second motor generator of the hybrid vehicle a signal for generating the estimated MG-assist torque.

* * * * *

UNITED STATES PATENT AND TRADEMARK OFFICE
CERTIFICATE OF CORRECTION

PATENT NO. : 10,293,692 B2
APPLICATION NO. : 15/295283
DATED : May 21, 2019
INVENTOR(S) : Dae Keun Yoo et al.

It is certified that error appears in the above-identified patent and that said Letters Patent is hereby corrected as shown below:

On the Title Page

Item (54), and in the Specification, Column 1, Lines 1-2, Title, delete "MOTOR GENERATED ASSIST TORQUE CONTROL FOR HYBRID VEHICLES" and insert --MOTOR-GENERATED ASSIST TORQUE CONTROL FOR HYBRID VEHICLES--, therefor.

In the Specification

In Column 7, Line 7, after "signal", delete "(a)" and insert --($\alpha$)--, therefor.

Signed and Sealed this
Sixteenth Day of July, 2019

Andrei Iancu
*Director of the United States Patent and Trademark Office*